(12) United States Patent
Taibi et al.

(10) Patent No.: US 8,189,560 B1
(45) Date of Patent: May 29, 2012

(54) RETRANSMISSION SWITCH BOX

(75) Inventors: Daniel Taibi, Baltimore, MD (US);
Robert Roberts, White Plains, MD (US); Eric Vandersall, Adelphi, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1034 days.

(21) Appl. No.: 12/130,007

(22) Filed: May 30, 2008

Related U.S. Application Data

(60) Provisional application No. 60/941,323, filed on Jun. 1, 2007.

(51) Int. Cl.
*H04L 12/28* (2006.01)

(52) U.S. Cl. ......... 370/351; 370/252; 370/354; 370/311

(58) Field of Classification Search ................ 370/351, 370/311, 252, 354, 329; 713/189, 187, 188, 713/300

See application file for complete search history.

(56) References Cited

U.S. PATENT DOCUMENTS

| | | | |
|---|---|---|---|
| 5,778,221 A * | 7/1998 | Temple | 712/244 |
| 5,931,950 A * | 8/1999 | Hsu | 713/300 |
| 7,489,674 B2 * | 2/2009 | Kim | 370/348 |
| 2002/0018460 A1 * | 2/2002 | Kawaguchi | 370/351 |
| 2004/0208180 A1 * | 10/2004 | Light et al. | 370/395.2 |

\* cited by examiner

*Primary Examiner* — Ricky Ngo
*Assistant Examiner* — Rasheed Gidado
(74) *Attorney, Agent, or Firm* — Amy Ressing; Suresh Koshy

(57) ABSTRACT

An apparatus for use with a first data device, a second data device, and a third data device operable to generate one of directly and indirectly an interrupt signal and to disable one of directly and indirectly the interrupt signal. The apparatus includes a switch connectable to the first data device, the second data device, and the third data device, the switch in a first state connecting the first data device and the second data device, the switch in a second state being operable, upon detection by the switch of the interrupt signal, to disconnect automatically the first data device from the second data device and to connect automatically thereafter the first data device to said the data device.

8 Claims, 6 Drawing Sheets

RETRANSMISSION SWITCH BOX

PRIORITY CLAIMS AND REFERENCE TO RELATED APPLICATIONS

This non-provisional patent application claims priority to U.S. Provisional Patent Application Ser. No. 60/941,323, filed 1 Jun. 2007, entitled "RETRANSMISSION SWITCH BOX," to Taibi et al., which provisional is incorporated herein by incorporated herein by reference.

BACKGROUND

1. Field of the Invention

This invention relates in general to a switch, and in particular to a retransmission switch box for use, for example, with portable communications devices.

2. Description of the Related Art

Some conventional portable communication devices are operable to communicate with computers, satellite communication ("SATCOM") link systems, and other conventional portable communication devices. FIG. 1 illustrates a conventional communication system that includes such conventional portable communication devices 102, 104, and further includes cables 110, 114, a SATCOM link system 106, and data circuit-terminating equipment ("DCE") 112.

The Harris AN/PRC-117F ("PRC") multi-band, multi-mission man pack radio is an example of such a conventional portable communication device. Local data applications for the PRC include, for example, the use of personal computer data cards such as ViaSat Inc.'s VDC-400 Personal Data Controller (a type II PC or PCMCIA-style) card and Innovative Concepts, Inc.'s PCIDM card for such roles as Tactical Air Control Parties, Forward Air Controllers, Air Liaison Officers, Fire Support Teams and/or Artillery Forward Observers.

Regarding FIG. 1, if both of the portable communication devices 102 and 104 are PRCs, the conventional communication system is operable as follows. The SATCOM link system 106 is operable to relay data from satellite 108 to PRC 102 via cable 110 and to relay data from PRC 102 to satellite 108. In a RETRANSMISSION mode, PRC 102 is operable to retransmit data, which is received from the SATCOM link system 106 to PRC 104. In a DATA mode, PRC 102 is operable to transmit/receive data to/from a point-to-point serial DCE (e.g., a modem or a facsimile machine) 112 via cable 114. In a VOICE mode, PRC 102 is operable to transmit or receive data to or from PRC 104.

The RETRANSMISSION mode extends the range of one conversation by retransmitting it down range to PRC 104 via PRC 102. For example, this is possible when PRC 104 is within an outlying line of sight ("LOS") of PRC 102, which in turn is in communication with the SATCOM link system 106. PRC 102 is operable to retransmit at a data frequency or modulation scheme that is different than that of the received data.

Applicants recognized that there is a problem associated with PRC 102, when used in the RETRANSMISSION mode. Specifically, if the operator of PRC 102 additionally requires data from DCE 112, cable 110 must be disconnected from PRC 102, and cable 114 must be connected to PRC 102. More specifically, a data port and retransmission port on PRC 102 share a single physical connector such that the operator must physically remove and replace a cable when switching radio operational scenarios. In practice, standard MC2127 connectors at the end of cables 110, 114, though reliable and sturdy, are frustrating and difficult to connect and disconnect from PRC 102. Considerable time and effort, for example, is expended to remove and/or connect these connectors. Such time and effort can be far better spent by a user on the configuration and operation of device 102 itself. Additionally, data or conversations may be lost.

Another disadvantage of the conventional cable configuration is, according to Applicants, that there is no way to quickly establish a communication channel between PRC 102 and PRC 104, when PRC 102 is being used to transmit (or receive) data from the SATCOM link system 106 and DCE 112. This can be particularly critical when an important conversation may come from PRC 104 to PRC 102. Applicants determined that what is lacking is device or method to quickly establish a communication channel between PRCs 102 and 104, even when PRC 102 is in communication with 108 or 112.

BRIEF SUMMARY

An embodiment of the instant invention includes a device or a method to quickly establish a communication channel between two portable communication devices, even when one device is in communication with at least one of a SATCOM link system or a computer.

An embodiment of the instant invention includes a device or a method to reduce setup time and aggravation in any situation where retransmission from one portable communication device to another portable communication device while an independent conversations is required between the two portable communication devices.

An embodiment of the instant invention includes a device or a method to increase the convenience of use of the PRC in situations where one radio is used for both local data and voice/data retransmission.

An embodiment of the instant invention includes a device or a method to adapt other military radios and shared data and voice communications networks used by commercial air transport, police, fire, and similar organizations so as to allow both voice and data operations.

In an embodiment of the instant invention, an operator is able to conveniently select a retransmission mode or a data mode without disconnecting cables.

In an embodiment of the instant invention, an operator is able to isolate the signal paths of the two radios so that each may be used independently of the other.

In an embodiment of the instant invention, an operator is able to select an AUTO mode. In the AUTO mode, the PRC defaults to DATA operation. When a voice signal is received on the non-data PRC network, however, the RSB is switched to the RETRANSMISSION mode, thus allowing high priority voice traffic, such as that often encountered in military operations, to automatically interrupt data traffic without requiring a listening watch and manual actions.

An embodiment of the instant invention permits a PRC operator to connect the PRC to a SATCOM link system and a computer once, and then to select a communication path between another PRC, the SATCOM link system and the computer without manually disconnecting or reconnecting cables, for example, solely with the turn of a knob. The embodiment of the present invention further includes an AUTO latching feature that allows the operator to send (or receive) data transmissions and automatically allow the outlying voice conversation to be patched through a switchbox to the retransmitting radio, for example, to a satellite or a distant radio. This allows optimal use of the PRC as a communications medium. The primary use of the PRC radio according to this embodiment of the instant invention is voice communication. With the AUTO mode of this embodiment of the present invention, an operator can send and receive data communications and not be concerned with tying up the communications channel for more critical voice traffic. When the PRC is used in Cipher Text ("CT") mode, the operator may monitor the conversations being retransmitted, further increasing the usefulness of the PRC. Cipher Text is a PRC feature that uses Type 1 encryption circuit, permitting two virtually independent internal paths to the PRC.

An embodiment of the invention includes an apparatus for use with a first data device, a second data device, a third data device operable to generate directly or indirectly an interrupt signal and to disable directly or indirectly the interrupt signal. The apparatus includes a switch connectable to the first data device, the second data device, and the third data device. The switch in a first state connects the first data device and the second data device. The switch in a second state is operable, upon detection by the switch of the interrupt signal, to disconnect automatically the first data device from the second data device and to connect automatically thereafter the first data device to the third data device.

Optionally, the switch is operable to return to the first state from the second state automatically, upon the third data device disabling the interrupt signal.

Optionally, the apparatus further includes a fourth data device. The first data device includes a point-to-point serial DCE. The second data device includes a radio transceiver. The third data device is operable to communicate with the fourth data device over a physical layer, the physical layer including a satellite communications path or a line-of-sight communications path. Optionally, the physical layer includes a radio frequency path. Optionally, the DCE includes a modem, a facsimile machine, or other serial data source.

Optionally, the interrupt signal includes a push-to-talk signal or a retransmit key-line signal, the switch being in the second state upon detection by the switch of the push-to-talk signal or the retransmit key-line signal.

An embodiment of the invention includes a method. A first data device is provided. A second data device is provided. A third data device is operable to generate directly or indirectly an interrupt signal and to disable directly or indirectly the interrupt signal. A switch is provided and is connectable to the first data device, the second data device, and the third data device. The switch in a first state connects the first data device and the second data device, permitting communication therebetween. The interrupt signal is detected by the switch and automatically transferring the switch into a second state by disconnecting automatically the first data device from the second data device and connecting automatically thereafter the first data device to the third data device, permitting communication therebetween.

Optionally, the switch is returned to the first state from the second state automatically, upon the third data device disabling the interrupt signal.

Optionally, a fourth data device is provided, wherein the first data device includes a point-to-point serial DCE, the second data device includes a radio transceiver, and the third data device is operable to communicate with the fourth data device over a physical layer, the physical layer including a satellite communications path or a line-of-sight communications path. Optionally, the physical layer comprises a radio frequency path. Optionally, the DCE includes a modem or a facsimile machine.

Optionally, the interrupt signal comprises one of a push-to-talk signal and a retransmit key-line signal, the switch being in the second state upon detection by the switch of one of the push-to-talk signal and the retransmit key-line signal.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate exemplary embodiments of the present invention and, together with the description, serve to explain the principles of the invention. In the drawings.

DETAILED DESCRIPTION OF THE PREFERRED EMBODIMENTS

Figure 1:
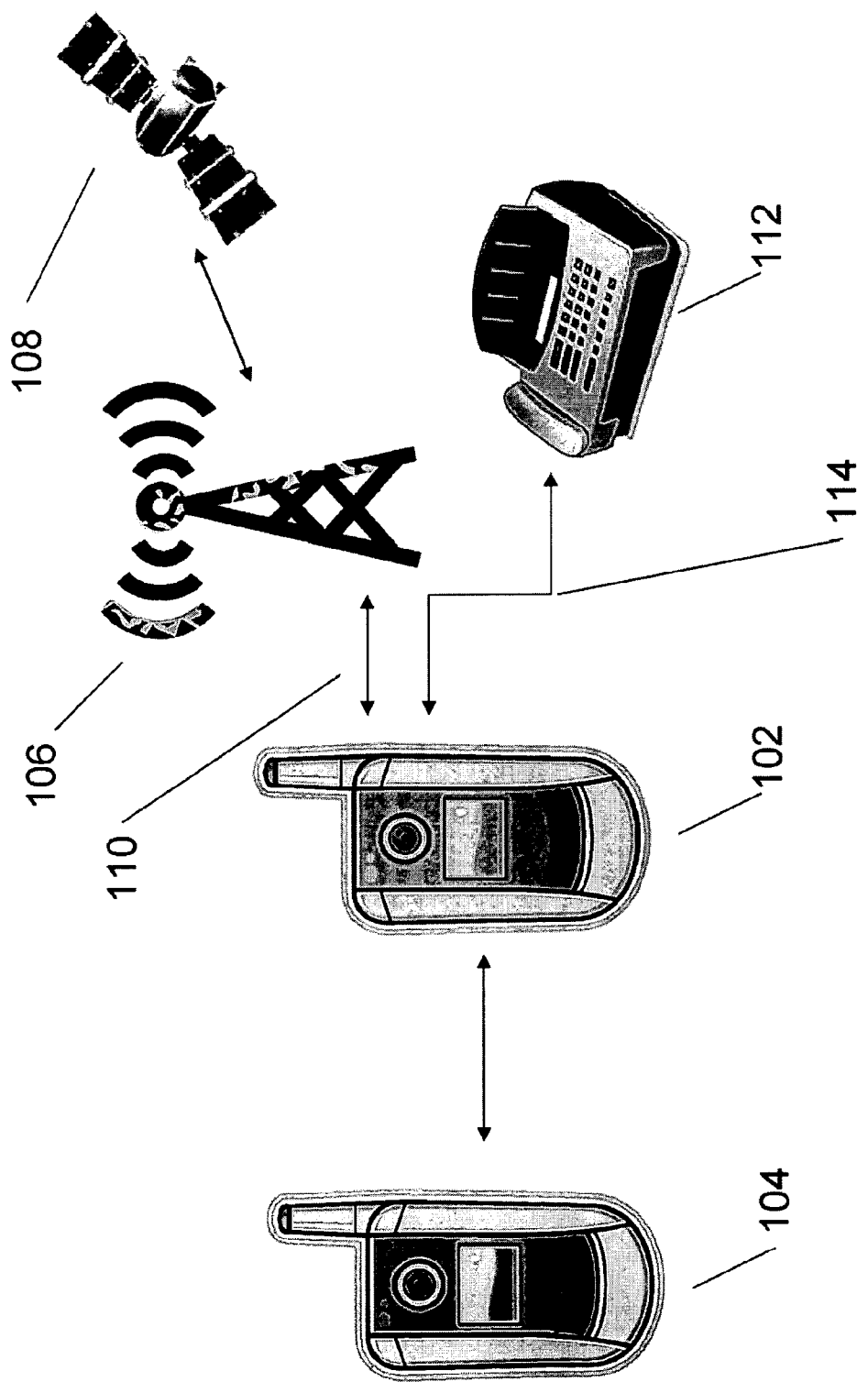
FIG. 1 is a block diagram of a conventional communications system.

An embodiment of the invention includes an apparatus. The apparatus includes a first data device, a second data device, a third data device operable to generate directly or indirectly an interrupt signal and to disable directly or indirectly the interrupt signal, and a switch connectable to the first data device, the second data device, and the third data device. The switch in a first state connects the first data device and the second data device. The switch in a second state is operable, upon detection by the switch of the interrupt signal, to disconnect automatically the first data device from the second data device and to connect automatically thereafter the first data device to the third data device.

Optionally, the switch is operable to return to the first state from the second state automatically, upon the third data device disabling the interrupt signal.

Optionally, the apparatus further includes a fourth data device. The first data device includes a point-to-point serial DCE. The second data device includes a radio transceiver. The third data device is operable to communicate with the fourth data device over a physical layer, the physical layer including a satellite communications path or a line-of-sight communications path. Optionally, the physical layer includes a radio frequency path. Optionally, the DCE includes a modem or a facsimile machine.

Optionally, the interrupt signal includes a push-to-talk signal or a retransmit key-line signal, the switch being in the second state upon detection by the switch of the push-to-talk signal or the retransmit key-line signal, the push-to-talk signal and the retransmit key-line signal being examples of signals generated by a typical PRC.

An embodiment of the invention includes a method. A first data device is provided. A second data device is provided. A third data device is operable to generate directly or indirectly an interrupt signal and to disable directly or indirectly the interrupt signal. A switch is provided and is connectable to the first data device, the second data device, and the third data device. The switch in a first state connects the first data device and the second data device, permitting communication therebetween. The interrupt signal is detected by the switch and automatically transferring the switch into a second state by disconnecting automatically the first data device from the second data device and connecting automatically thereafter the first data device to the third data device, permitting communication therebetween.

Optionally, the switch is returned to the first state from the second state automatically, upon the third data device disabling the interrupt signal.

Optionally, a fourth data device is provided, wherein the first data device includes a point-to-point serial DCE, the second data device includes a radio transceiver, and the third data device is operable to communicate with the fourth data device over a physical layer, the physical layer including a satellite communications path or a line-of-sight communications path. Optionally, the physical layer comprises a radio frequency path. Optionally, the DCE includes a modem, a facsimile machine, or other serial data source.

Optionally, the interrupt signal comprises one of a push-to-talk signal and a retransmit key-line signal, the switch being in the second state upon detection by the switch of one of the push-to-talk signal and the retransmit key-line signal.

Figure 2:
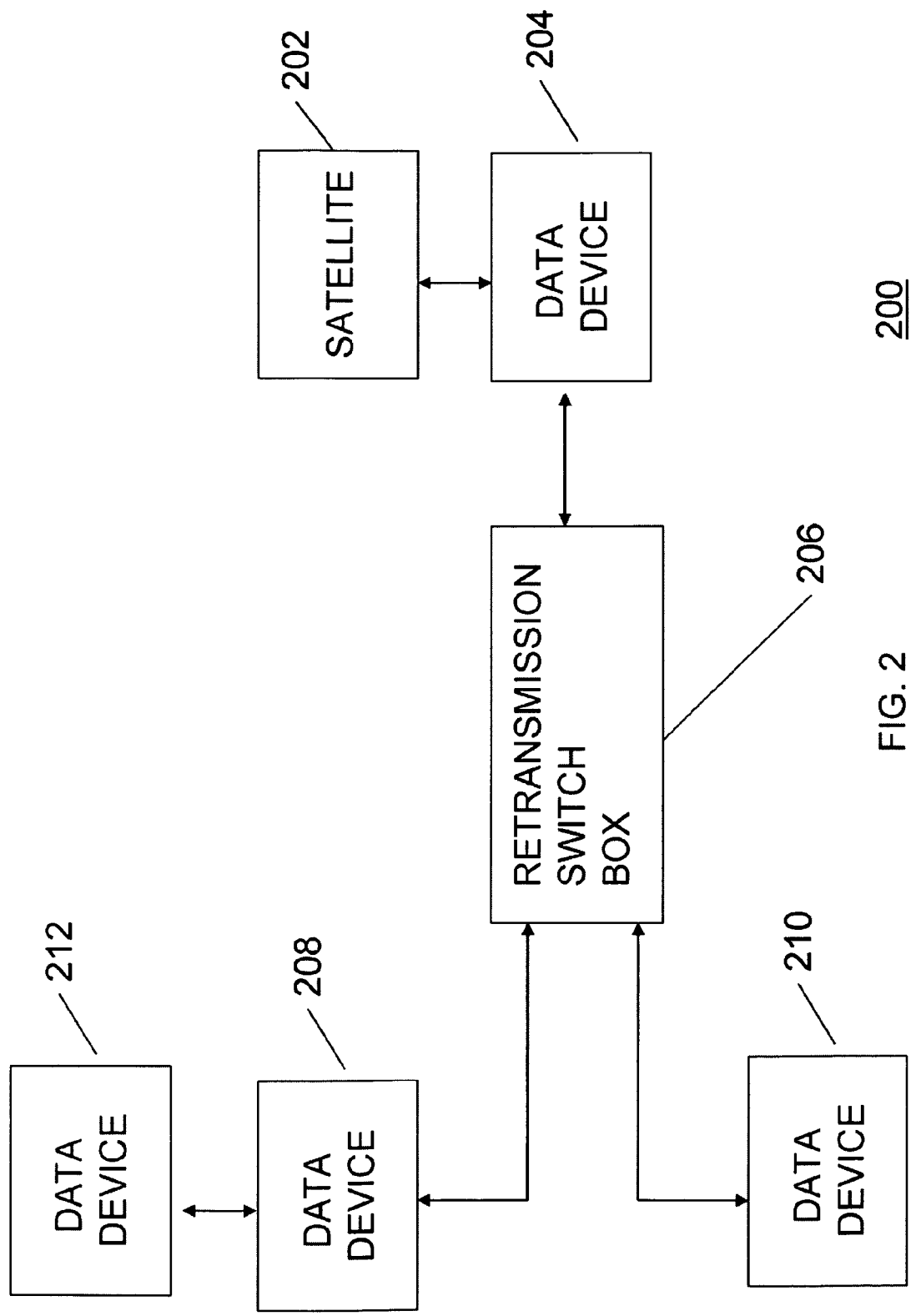
FIG. 2 is a block diagram of a communication system in accordance with an embodiment of the present invention.

FIG. 2 illustrates a communication system 200 in accordance with an embodiment of the present invention. Communication system 200 includes a communication satellite 202, a data device 204, a retransmission switching device 206, a data device 208 and a data device 210. Communication satellite 202 is capable of transmitting communication signals to data device 204. Further, communication satellite 202 is capable of receiving communication signals from data device 204. The transmitted or received communication signals include, for example, audio, video, and/or data components. Data device 204 is capable of transmitting communication signals to either data device 208 or data device 210, via retransmission switching device 206. Further, data device 204 is capable of receiving communication signals from either data device 208 or data device 210 via retransmission switching device 206. Data device 210 is capable of transmitting communication signals to data device 208 and data device 204 via retransmission switching device 206. Additionally, data device 210 is further capable of receiving communication signals from data device 204 via retransmission switching device 206. The DATA mode connections between data devices 204, 208, 210 and retransmission switching device 206 are, for example, standard serial connections or standard parallel universal asynchronous receiver/transceiver ("UART") connections. VOICE mode connections between data device 208 and data device 204 are not standard serial connections, but rather standard parallel connections.

In an embodiment of the present invention, the operator is not required to physically remove and replace a cable when switching radio operational scenarios. As such, considerable time and effort is saved and is far better spent on the configuration and operation of the system itself. For example upon detection of a signal, a communication channel may be quickly established between data device 208 and data device 204, when data device 208 is being used to transmit (or receive) data from data device 210. This can be particularly critical when an unexpected important communication comes from data device 204.

In a particular embodiment of the invention, data device 204 comprises a standard radio transceiver such as a standard SATCOM link system, data device 208 comprises a standard PRC and data device 210 comprises a standard DCE. Further, retransmission switching device 206 is operable to switch between a first connection of data device 208 and data device 204 and a second connection of data device 210 and data device 204. The retransmission switching device 206 is not operable to switch to a connection between data device 208 and data device 210.

In an illustrative mode of operation, retransmission switching device 206 initially connects data device 208 to data device 210 thereby permitting hard-wired transmission/reception of data signals between the devices. In this exemplary mode of operation, retransmission switching device 206 is operable to disconnect data device 208 from communication device 210 and connect data device 208 to data device 204. In other words, retransmission switching device 206 is operable to switch the communication device from communicating with data device 210 to communicating with data device 204. More importantly, retransmission switching device 206 is operable to make such a switch without interaction by a user, such as upon detection of a signal, such as an interrupt signal.

Figure 3:
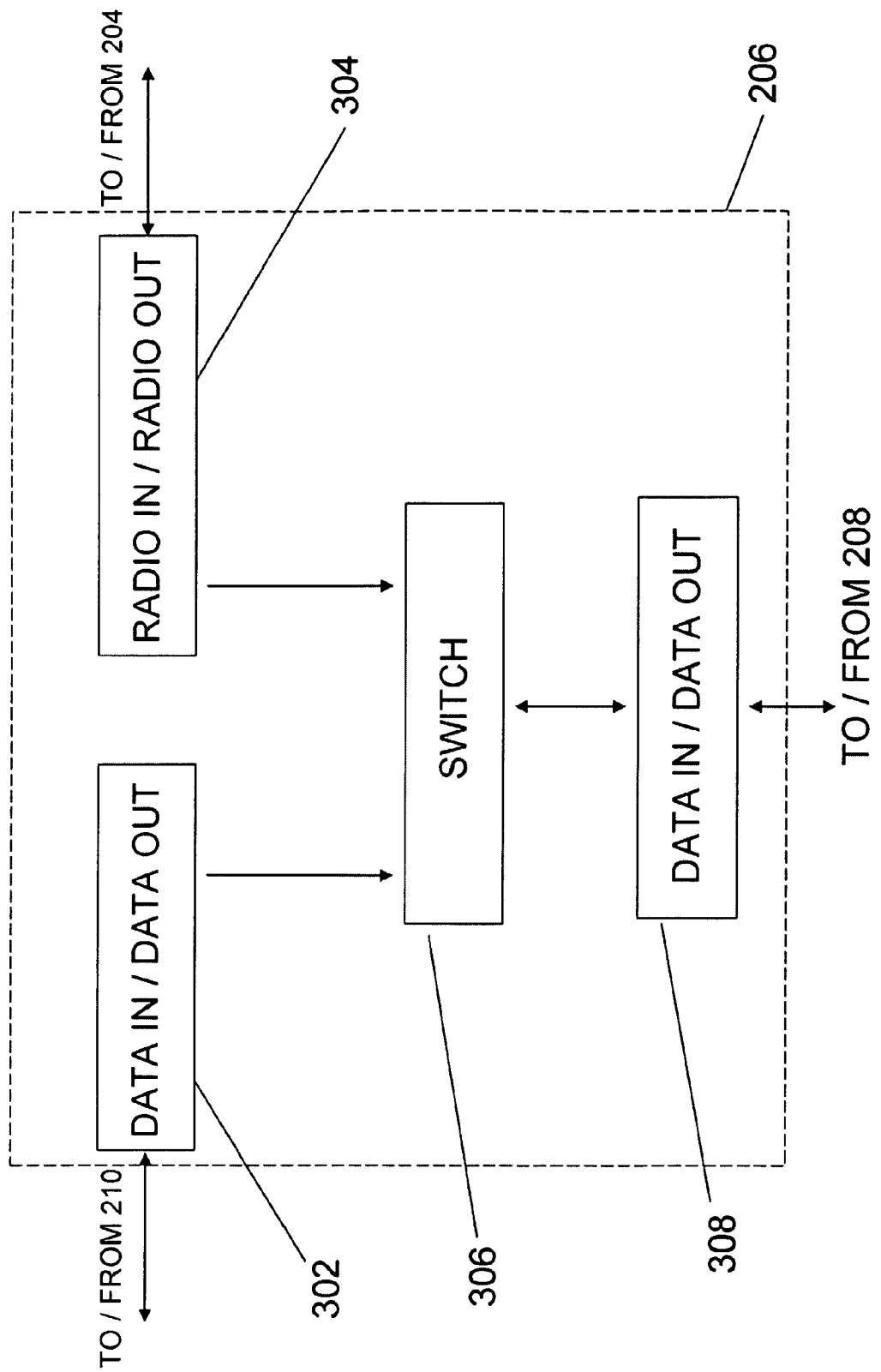
FIG. 3 is a block diagram of functional elements of an illustrative retransmission switching device in accordance with an embodiment of the present invention.

As illustrated in FIG. 3, retransmission switching device 206 includes a data input/data output portion 302 that is in communication with data device 210, a radio transceiver input/radio transceiver output portion 304 that is in communication with data device 204, a switch 306, and a data input/data output portion 308 that is in communication with data device 208.

Figure 4:
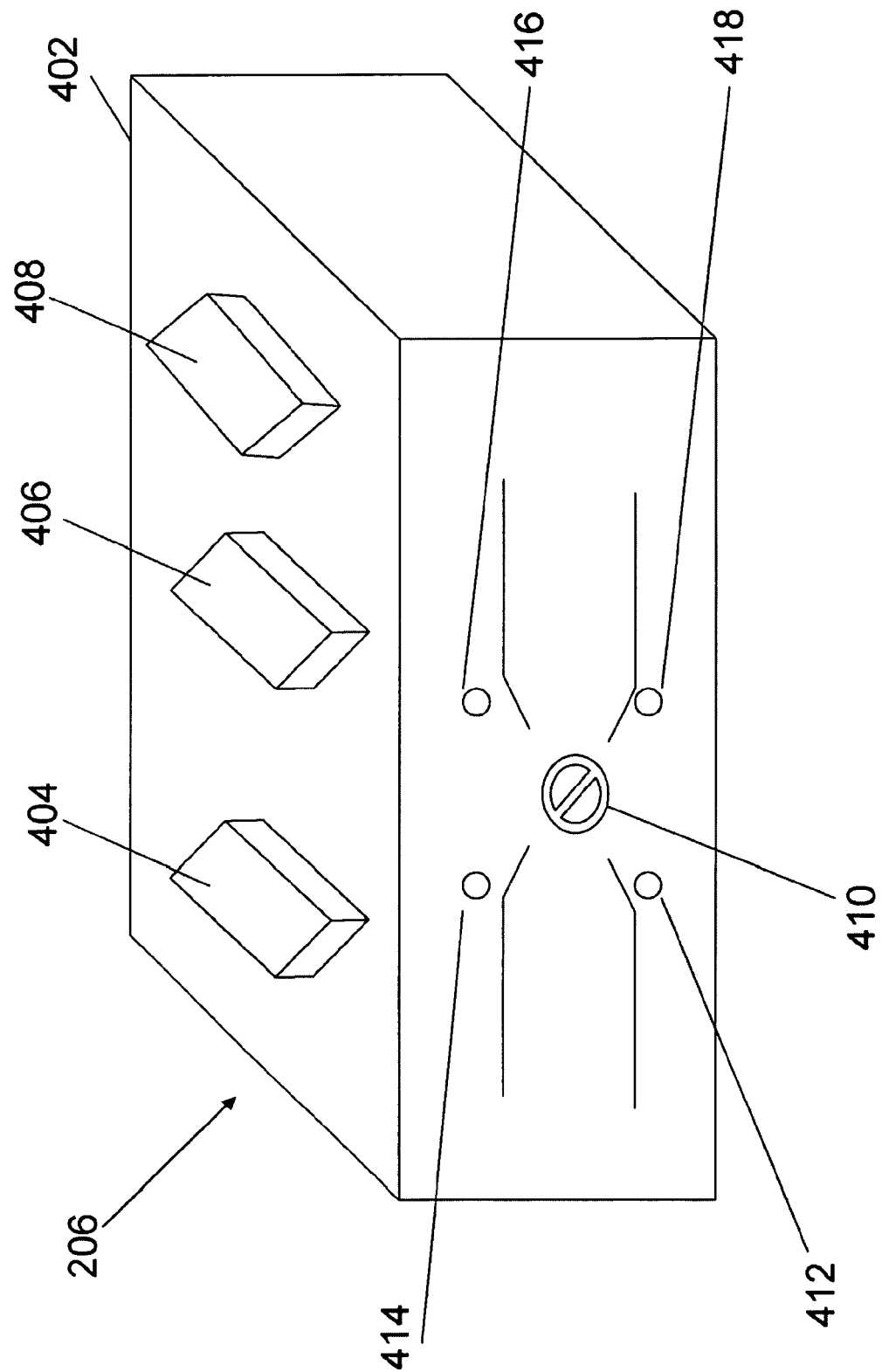
FIG. 4 is a perspective view of an illustrative retransmission switching device in accordance with the present invention.

FIG. 4 illustrates an exemplary embodiment of switching device 206 in accordance with the present invention. Retransmission switching device 206, for example, includes a switch box. In such an embodiment, the switch box 206 includes a body 402, data input/data output port 404, radio input/radio output port 406, data input/data output port 408, rotary switch 410, RETRANSMISSION mode indicator 412, an AUTO mode indicator 414, a VOICE mode indicator 416 and/or a DATA mode indicator 418. Illustrative indicators 412, 414, 416, and 418 include LED indicators, but other indicators are also acceptable. Data input/data output port 404 is operable to receive one end of a connector, for example an RS-232 cable, to enable communication with data device 210. Data input/data output port 406 is operable to receive one end of a connector, for example and RS-232 cable, to enable communication with data device 208. Radio input/radio output port 408 is operable to receive one end of a connector, for example and RS-232 cable, to enable communication with data device 204.

Rotary switch 410 is, for example, a four position, three pole rotary switch. Rotary switch 410, for example, is operable to rotate among a first position corresponding to a RETRANSMISSION mode of operation, a second position corresponding to an AUTO mode of operation, a third position corresponding to a VOICE mode of operation, and a fourth position corresponding to a DATA mode of operation. (The RETRANSMISSION, AUTO, VOICE, AND DATA modes of operation are discussed below). Of course, these modes of operation may be positioned in any order. Further, any switching mechanism or system is optionally used in place of rotary switch 410, so long as the switching mechanism or system is operable to switch between the plurality of modes of operation.

RETRANSMISSION mode indicator 412 indicates when rotary switch 410 is arranged in the first position and thus indicates when retransmission switching device 206 is in the RETRANSMISSION mode of operation. AUTO mode indicator 414 indicates when rotary switch 410 is arranged in the second position and thus indicates when retransmission switching device 206 is in the AUTO mode of operation. VOICE mode indicator 416 indicates when rotary switch 410 is arranged in the third position and thus indicates when retransmission switching device 206 is in the VOICE mode of operation. DATA mode indicator 418 indicates when rotary switch is arranged in the fourth position and thus indicates when retransmission switching device 206 is in the DATA mode of operation.

Operation of retransmission switching device 206 will now be described with respect to FIGS. 1-3. As mentioned above, retransmission switching device 206 has a plurality of operation modes, for example, including: 1) a RETRANSMISSION mode; 2) an AUTO mode; 3) a VOICE mode, and 4) a DATA mode.

In the RETRANSMISSION mode, relays in retransmission switching device 206, for example, connect data device 208 to data device 204 thereby permitting hard-wired transmission/reception of signals between the data devices. Accordingly, a signal received by data device 204 from satellite 202 is, for example, hard-wired transmitted to data device 208 in order to be retransmitted to another communication device, e.g., a data device 212. As another example, in the RETRANSMISSION mode, retransmission switching device 206 connects data device 210 to data device 204 thereby permitting hard-wired transmission/reception of signals between the data devices.

In the VOICE mode, retransmission switching device 206 disconnects data device 208 from data device 210 and from data device 204. Accordingly, data device 208 is operable to transmit/receive radio signals to/from data device 212. Therefore in the VOICE mode, retransmission switching device 206 permits data device 208 to function as a conventional radio communication device.

In the DATA mode, relays in retransmission switching device 206 connect data device 204 to data device 210 thereby permitting hard-wired transmission/reception of data signals between the devices.

In the AUTO mode, relays in retransmission switching device 206, for example, initially connect data device 210 to data device 204 thereby permitting hard-wired transmission/reception of data signals between the data devices; data devices 210, 204 are in DATA mode. However, in the AUTO mode, if data device 208, for example, receives a push-to-talk trigger signal from data device 212 or a retransmit key-line signal goes low, for example, then the latch in retransmission switching device 206 disconnects data device 210 from data device 204 and connect data device 208 to data device 204, forcing data device 204 into VOICE mode. In other words, retransmission switching device 206 is operable to switch data device 204 from communicating with data device 210 to communicating with data device 208. Retransmission switching device 206 is operable to make such a switch, when in the AUTO mode, upon an occurrence of an event or a signal without interaction by a user at the retransmission switching device 206.

For example, retransmission switching device 206 is operable to make such a switch upon detection of an outlying communication device, for example data device 112, attempting to communicate with data device 108. This exemplary embodiment will be further explained below, in reference to FIGS. 5A and 5B.

Figure 5A:
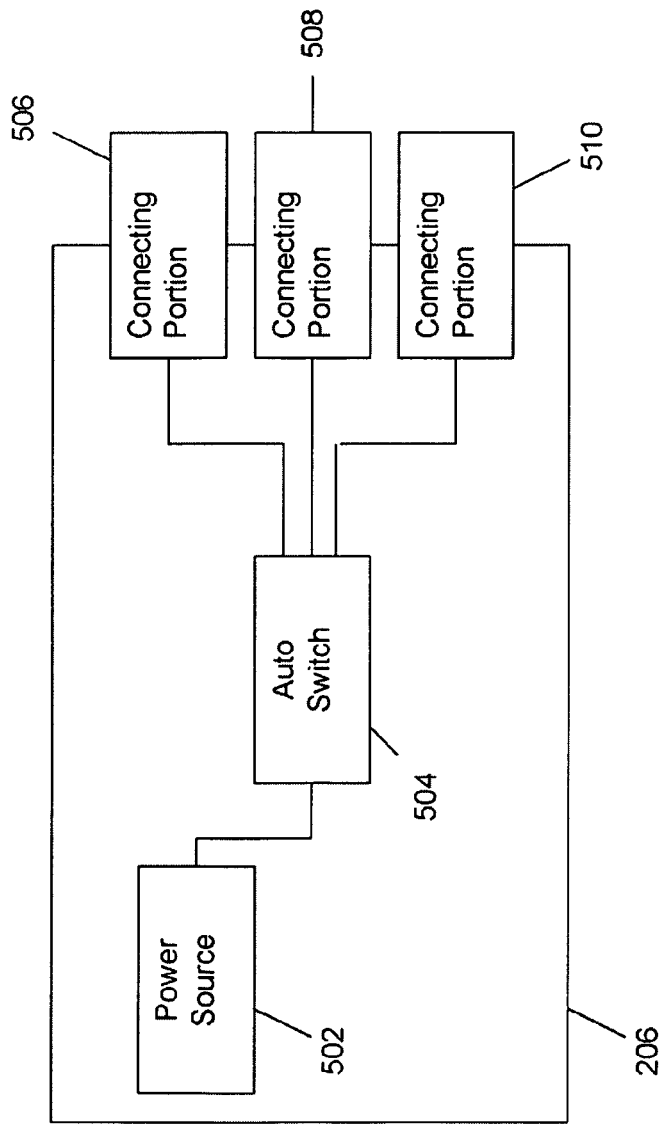
FIG. 5A is a block diagram of components of an illustrative retransmission switching device in accordance with the present invention.
Figure 5B:
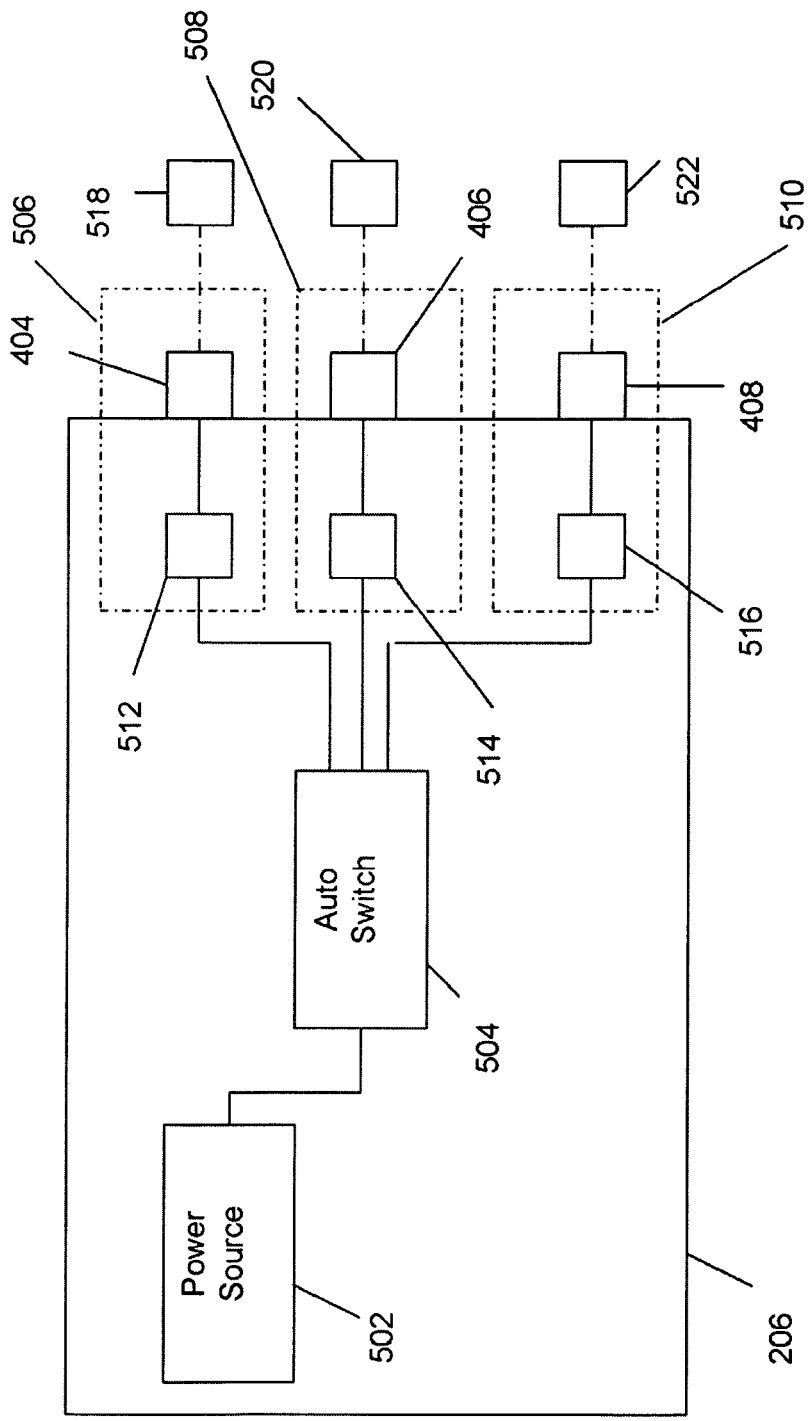
FIG. 5B is a block diagram of components of an illustrative retransmission switching device in accordance with the present invention.

As shown by way of illustration in FIG. 5A, retransmission switching device 206 includes a power source 502, an auto switch 504, connecting portion 506, connecting portion 508 and connecting portion 510. FIG. 5B shows by way of illustration an embodiment of the retransmission switching device 206 wherein: connecting portion 506 includes connector 404 and connector 512; connecting portion 508 includes connector 406 and connector 514; and connecting portion 510 includes connector 408 and connector 516. Connector 404 is removably connectable to an external connector 518, which is connected to data device 210. Connector 512 provides connection between connector 404 and auto switch 504. Connector 406 is removably connectable to an external connector 520, which is connected to data device 208. Connector 514 provides connection between connector 406 and auto switch 504. Connector 408 is removably connectable to an external connector 522, which is connected to data device 204. Connector 516 provides connection between connector 408 and auto switch 504.

In another embodiment of the invention, the AUTO mode is practiced as follows. The following discussion assumes that one or more of the data devices are Harris PRC-117F radios. A PRC has three ports: J1, J2, and J3. The J1 port is an auto-sensing port that automatically configures the radio for voice or data depending on what is connected (e.g., a data device such as a facsimile machine or a voice handset). The J2 port is a VHF band line of sight antenna port. The J3 port is a UHF band SATCOM antenna port. In AUTO mode of the retransmission switching device 206, the initial state of data device 204 is the DATA mode configuration.

In AUTO mode, the retransmission switching device detects either of these state transitions, switches from DATA mode to RETRANSMISSION mode, and latches into the RETRANSMISSION mode.

Once latched in RETRANS mode, the RSB makes connections between the ports of the appropriate PRCs. The retransmission switching device will stay in RETRANSMISSION mode until a user resets the latching circuit by switching out of AUTO mode. That is, to reset the latch, the user toggles the rotary switch or knob 410. The user can switch out of AUTO mode, for example, by turning rotary switch 410 to VOICE mode, DATA mode, or RETRANSMISSION mode.

The AUTO mode is, for example, implemented with Transistor-Transitor Logic Integrated Circuits ("TTL ICs"). Although the retransmission switching device in general and the AUTO mode in particular can be implemented using alternative types of digital logic such as emitter-coupled logic, metal-oxide semiconductors, complementary metal-oxide semiconductors and intergrated-injection logic, TTL ICs are simple, reliable, and are easy to use in analog circuit design. It should be understood, of course, that other embodiments of the invention embody the retransmission switching device in field programmable gate arrays, complex programmable logic devices, digital signal processors, and/or central processing units. Data devices such as the Harris PRC-117F adhere to RS-232 TTL signal level specifications, so using TTL ICs is a sensible digital logic choice.

In an embodiment of the invention, a core TTL IC to the latching feature mentioned above with respect to the AUTO mode is the 74LS173 chip, which is a standard D-type flip-flop-based latch circuit. When a signal is applied to the 74LS173's input and the clock ("CLK") input is pulsed, then the input is transferred to the 74LS173 chip's output. This output remains (i.e., continues to be latched) until a Clear ("CLR") signal is applied to the 74LS173, or the CLK signal is pulsed again. The CLR signal is applied by toggling the rotary switch 410. The CLR signal is applied to the 74LS173 in the three modes of operation other than AUTO mode; this ensures an initial logical low output of the 74LS173, when AUTO mode is engaged.

A constant logical high ("Vcc") is applied to the input of the 74LS173. This signal is transferred to the output when the CLK input is pulsed. This pulse is supplied by the 74LS32 OR gate. When the PRC-117F is in CT mode, and the RETRANSMISSION KEY LINE OUT signal transitions low and the 74LSO4 NOT gate transitions high, which triggers the OR gate to transition high. When the OR gate transitions high, the 74LS173's CLK input is pulsed. When the PRC-117F is in PT mode, the DCD signal transitions high, which triggers the OR gate to transition high. This in turn pulses the CLK input on the 74LS173.

In an embodiment of the invention, the retransmission switching device's switching network is built around Solid State Optronic's SQR101 solid-state, optically coupled relay integrated circuit. But, it should be understood that there are numerous alternative companies that offer solid-state, optically coupled relays, such as Fairchild Semiconductor. Indeed, although solid-state relays are preferred, in an embodiment of the invention, they could be replaced with mechanical relays.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for use with a first data device, a second data device, and a third data device operable to generate one of directly and indirectly an interrupt signal and to disable one of directly and indirectly the interrupt signal, the apparatus comprising:
a switch connectable to said first data device, said second data device, and said third data device, said switch in a first state connecting said first data device and said second data device, said switch in a second state being operable, upon detection of the interrupt signal, to disconnect automatically said first data device to said third data device;
wherein said switch is operable to return to the first state from the second state automatically, upon said third data device disabling the interrupt signal;
the apparatus further comprising a fourth data device, wherein said first data device comprises point-to-point serial data circuit-terminating equipment, said second data device comprising a radio transceiver, and said third data device operable to communicate with said with said fourth data device over a physical layer, the physical layer comprising one of a satellite communications path and a line-of-sight communications path.

2. The apparatus according to claim 1, wherein said physical layer comprises a radio frequency path.

3. The apparatus according to claim 1, wherein said point-to-point serial data circuit-terminating equipment comprises one of a modem and a facsimile machine.

4. The apparatus according to claim 1, wherein said interrupt signal comprises one of a push-to-talk signal and a retransmit key-line signal, said switch being in the second state upon detection by said switch of one of said push-to-talk signal and said retransmit key-line signal.

5. A method comprising:
providing a first data device;
providing a second data device;
providing a third data device operable to generate one of directly and indirectly an interrupt signal and to disable one of directly and indirectly the interrupt signal;
providing a switch connectable to the first data device, the second data device, and the third data device, the switch in a first state connecting the first data device and the second data device, permitting communications therebetween;
detecting the interrupt signal by the switch and automatically transferring the switch into a second state by disconnecting automatically the first data device from the second data and connecting automatically thereafter the first data device to the third data device, permitting communication therebetween; returning the switch to the first state from the second state automatically, upon the third data device disabling the interrupt signal;
providing a fourth data device, wherein the first data device comprises point-to-point serial data circuit-terminating equipment, the second data device comprising a radio transceiver, and the third data device operable to communicate with the fourth data device over a physical layer, the physical layer comprising one of a satellite communications path and a line-of-sight communication path.

6. The method according to claim 5, wherein the physical layer comprises a radio frequency path.

7. The method according to claim 5, wherein the point-to-point serial data circuit-terminating equipment comprises one of a modem and a facsimile machine.

8. The method according to claim 5, wherein the interrupt signal comprises one of a push-to-talk signal and a retransmit key-line signal, the switch being in the second state upon detection by the switch of one of the push-to-talk signal and the retransmit key-line signal.

* * * * *